(12) United States Patent
Schwenk et al.

(10) Patent No.: US 6,590,995 B1
(45) Date of Patent: Jul. 8, 2003

(54) METHOD OF INSERTING MANIPULATION-PROOF DIGITAL FINGERPRINTS INTO ELECTRONIC DOCUMENTS

(75) Inventors: Joerg Schwenk, Dieburg (DE); Johannes Ueberberg, St. Augustin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/285,828

(22) Filed: Apr. 2, 1999

(30) Foreign Application Priority Data

Apr. 3, 1998 (DE) .......................................... 198 16 356

(51) Int. Cl.[7] .............................. G06K 9/00; G06K 9/68; H04N 7/167; H04L 9/00
(52) U.S. Cl. ...................... 382/100; 382/219; 380/201; 713/176
(58) Field of Search ................................ 382/100, 218, 382/219, 232; 380/201, 202, 203, 54, 28; 713/176; 370/527, 529; 399/366

(56) References Cited

U.S. PATENT DOCUMENTS

| 4,972,477 A | | 11/1990 | Campbell et al. ............. 380/28 |
|---|---|---|---|
| 5,467,447 A | | 11/1995 | Vogel .......................... 707/500 |
| 5,600,738 A | | 2/1997 | Bergland et al. .............. 385/31 |
| 5,748,783 A | * | 5/1998 | Rhoads ........................ 382/232 |
| 5,790,703 A | * | 8/1998 | Wang .......................... 382/212 |
| 5,949,885 A | * | 9/1999 | Leighton ..................... 380/54 |
| 2001/0008557 A1 | * | 7/2001 | Stefik et al. ................ 380/202 |

OTHER PUBLICATIONS

Cox et al, "Secure Spread Spectrum Watermaking for Multimedia", Dec. 1997, IEEE Paper ISSN: 1057-7149, vol. 6, Issue 12, pp. 1673-1687.*
Pfitzmann et al, "Asymmetric Fingerprinting for Larger Collusions", Apr. 1997, ACM ISBN: 0-89791-912-2, pp. 151-160.*
C. Chojetzki, et al. Spectral Determination of Modal Birefringence and Polarization Dispersion of Polarization–Maintaining Fibers with a high Accuracy, Journal of Optical Communications, 13 (1992), pp. 140-145.
*Dan Boneh and James Shaw, Collusion–Secure Fingerprinting for Digital Data, Proc. Crypto "95" LNCS, Springer Verlag, Berlin 1995, pp. 452-465.

* cited by examiner

Primary Examiner—Mehrdad Dastouri
(74) Attorney, Agent, or Firm—Kenyon & Kenyon

(57) ABSTRACT

The present method concerns inserting manipulation-proof digital fingerprints into electronic documents making it possible to detect manipulations by purchasers or groups of purchasers. According to the present invention based on a predefined number of copies and a maximum number of copying hackers per document, a location or an area for the digital fingerprint of the customer is defined for each copy. All the locations or areas defined in the document for digital fingerprints are subject in their totality to an enclosed finite geometric ordering system, in which intersections of the digital fingerprints occur at defined locations or areas. By analyzing the intersection points not found by the hackers, the hackers involved in the manipulation can be uniquely determined. The method described is suitable, in particular, for identifying copies of documents which are subject to copyright protection.

5 Claims, 3 Drawing Sheets

METHOD OF INSERTING MANIPULATION-PROOF DIGITAL FINGERPRINTS INTO ELECTRONIC DOCUMENTS

FIELD OF THE INVENTION

The present invention relates to providing a digital fingerprint for an electronic document.

SUMMARY OF THE INVENTION

Due to the rapid growth of the Internet and the possibility to digitally distribute documents, there is an increasing need to protect against illegal distribution of documents and thus to protect copyright holders against pirated copies.

For this purpose, large corporations like IBM, NEC and Microsoft, and also smaller companies like Digimarc (see Funkschau 17/97; p. 21) and research institutes such as the Fraunhofergesellschaft IGD and GMD Darmstadt are working on imbedding digital watermarks in documents. In processes based on this principle, a piece of information that identifies the copyright holder is invisibly inserted into the documents to be protected. The type of digital watermark inserted depends on the particular type of document (e.g., PostScript, JPEG, MPEG-1).

Digital watermarks allow the copyright holder to ascertain its intellectual property in an illegally distributed document.

Digital watermarks, however, do not make it possible to identify the person responsible for illegal distribution or to prove that that person is responsible for the illegal distribution.

Digital fingerprints go one step further. In using the principle of securing a document using digital fingerprints, the name of the customer who purchases an electronic copy of the document is invisibly inserted into the document in addition to the digital watermark of the copyright holder. Should this customer further distribute his copy contrary to the interests of the copyright holder, he can be uniquely identified and held liable using his electronic fingerprint contained in all illegal copies. (Dan Boneh and James Shaw: Collusion-Secure Fingerprinting for Digital Data, Proc. CRYPTO "95" LNCS 963, Springer Verlag, Berlin 1995, 452–465.)

The principle of securing documents using digital fingerprints has so far had one serious weakness resulting from the fact that the documents assigned to individual customers differ in their bit patterns exactly at the location where the individual user-specific fingerprint of the different customers is located. If a customer comes into possession of the document of a second customer, he can trace the locations with the different digital fingerprints by comparing the two documents bit by bit and remove (delete) those locations from the document. The object of such a manipulation is always to obtain a copy of the document from which the user-specific fingerprints have been removed.

SUMMARY OF THE INVENTION

An object of the present invention is to eliminate this shortcoming. As previously, each document should be assigned to one customer only. The customers should not be capable, either individually or as a group, of deleting all the customer-specific fingerprints. Furthermore, the present invention helps make it possible to determine without doubt, from the still remaining fragments of the digital fingerprints of an illegally distributed document, which customers or which documents were involved in the manipulation. Customers involved in such manipulations are henceforth referred to as hackers.

The present invention provides a method of inserting manipulation-proof digital fingerprints into electronic documents, in which each purchaser is assigned a copy of a document in which an individual fingerprint, assigned to the respective purchaser of the copy, which is not recognizable by the purchaser, is inserted as a marking. The present invention is characterized in that the marking locations of the individual digital fingerprint that is different for each copy are assigned using finite geometric structures, the copy of each purchaser being marked at locations determined by the geometric substructure assigned to the respective customer and a secret function. The points thus established for each purchaser as a digital fingerprint are determined within the geometric structure so that they intersect with fingerprint points of other purchasers; and, using bit-by-bit comparison of the original document with a copy from which parts of fingerprints have been removed by manipulation of at most d purchasers, copies involved in the manipulation and thus the purchasers acting as hackers are identified from the set of fingerprint intersections still present.

With the present invention, a hacker in comparing documents of different customers may be able discover the locations where the fingerprints differ, but he cannot identify those locations in both documents where the fingerprints are identical.

According to the present invention, a location or an area for the digital fingerprint of the customer is defined for each copy from a predetermined number of copies of the document. All the locations and areas defined in the document for the digital fingerprints are subject, in their totality, to an enclosed finite ordering system, in which intersections of the digital fingerprints are defined at exactly defined locations or areas. In the case of a digital fingerprint place assignment performed according to this principle, all locations or areas S, where digital fingerprints intersect, cannot be identified by the customers whose digital fingerprints intersect at location or area S. If the number of hackers does not exceed the number of hackers allowed by the system, the hackers involved in the manipulation can be uniquely identified using a comparison of the document with the manipulated copy, based on the analysis of the intersection points not found by the hackers.

According to the present invention, the fingerprints are placed on the basis of finite geometric structures, with a unique place of the selected finite geometric structure being assigned to each individual point of a fingerprint. Clearly defined areas, which can be deduced from the geometric structure, such as intersection points, for example, where digital fingerprints intersect according to the assignment of the individual digital fingerprints, are defined within the finite geometric structure. These areas, referred to as points of intersection S, cannot be identified by the customers whose digital fingerprints intersect at these locations or areas S. In the case of manipulation, it is to be assumed that the hackers will generally not succeed in deleting all the points or areas of intersection.

Based on the geometric regularities existing in finite geometric structures, the customers involved in the manipulation as hackers can be identified using the points or areas of intersection that they did not identify.

Dual rational normal curves in finite projective planes or dual rational normal curves in finite projective spaces can be used, for example, as finite geometric structures in the context of the present invention.

The use of dual rational normal curves in projective spaces is particularly recommended when copies of the document have to be distributed to a large number of customers.

BRIEF DESCRIPTION OF THE DRAWINGS

The method according to the present invention is explained in more detail with reference to two embodiments, in which.

DETAILED DESCRIPTION

Figure 1:
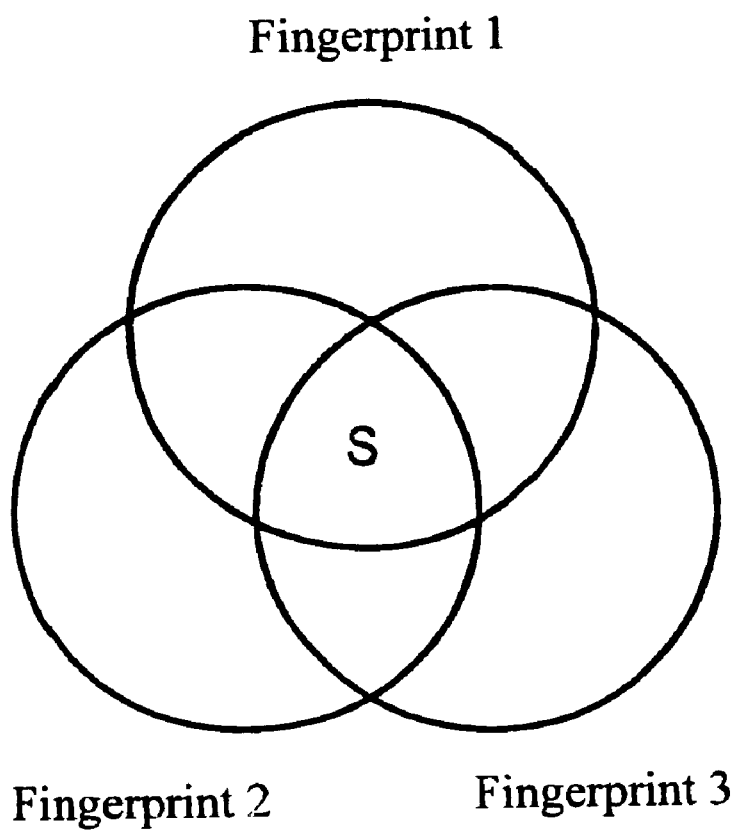
FIG. 1 shows the principle of the method according to the present invention using an example of three fingerprints.

FIG. 1 shows the principle of the method according to the present invention using the example of three fingerprints. The three fingerprints 1, 2 and 3 are arranged within a projective plane according to geometric points of view on the document to be protected so that they intersect in area S. Each fingerprint 1, 2 and 3 is arranged in one copy of the document.

Purchasers acting as hackers can identify locations where the fingerprints differ, but not those locations where they are identical. For example, if the purchasers of copy 1 and copy 2 get together, they can only recognize and remove the differing portions of fingerprint 1 and fingerprint 2. Since the intersecting portion from the intersecting area S is identical on the copy of purchaser 1 and on that of purchaser 2, this area cannot be identified and therefore remains preserved on the manipulated copy. Using bit by bit comparison of the original document with the manipulated copy, the locations where manipulations were performed can be reconstructed. The hackers are identified by comparing the reconstructed fingerprints with the fingerprints of the original document.

Figure 2:
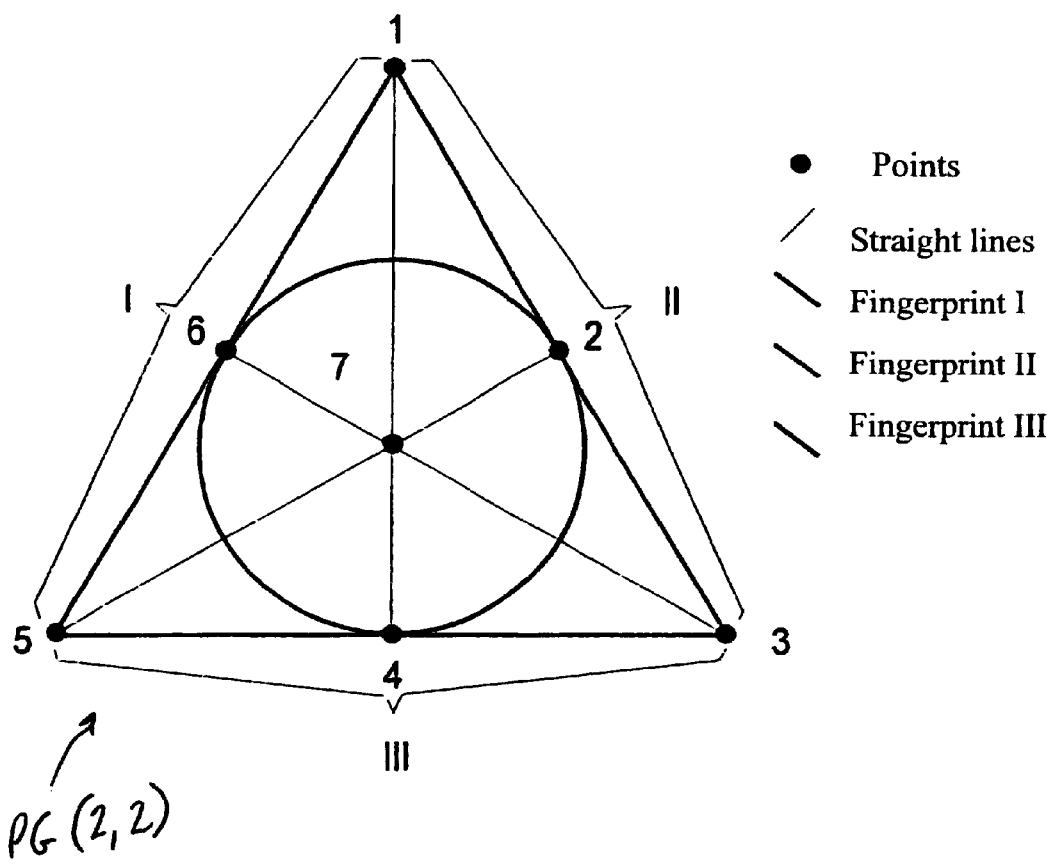
FIG. 2 shows schematically the arrangement of three different digital fingerprints in a projective plane PG(2,2)

FIG. 2 shows the arrangement of three different digital fingerprints in a projective plane PG(2,2).

All points and straight lines in projective plane PG(2,2) are drawn in. One location in the document is assigned to each point in the projective plane using a secret function (one-way function). Each customer then receives a copy of the document where only those locations relevant to his digital fingerprint are marked. This can be accomplished, for example, by inverting the bits at the respective locations belonging to his fingerprint. For customer I, these would be, for example, the locations assigned to points 1, 5 and 6. If now two customers compare their fingerprints bit by bit using their documents, they will find all the marked locations except for the location at the point of intersection of the two fingerprints. For example, if customer I and customer II were to compare the fingerprints on their documents, they would be able to find the locations corresponding to points 2, 3, 5 and 6. They cannot, however, find the location corresponding to point 1, since the bit values of the location corresponding to point 1 are identical in both copies. In the version selected in the first embodiment, identification of the hackers is still possible even if a maximum of two customers collude as hackers, since each point of intersection can only be missed by exactly two hackers. In the embodiment according to FIG. 1, point 1 can only be missed by hackers I and II in this case. If customer II and customer III collude as hackers, they would be unable to find point 3. In this system with 3 customers all three customers would have to collude in order to find all the points.

Figure 3:
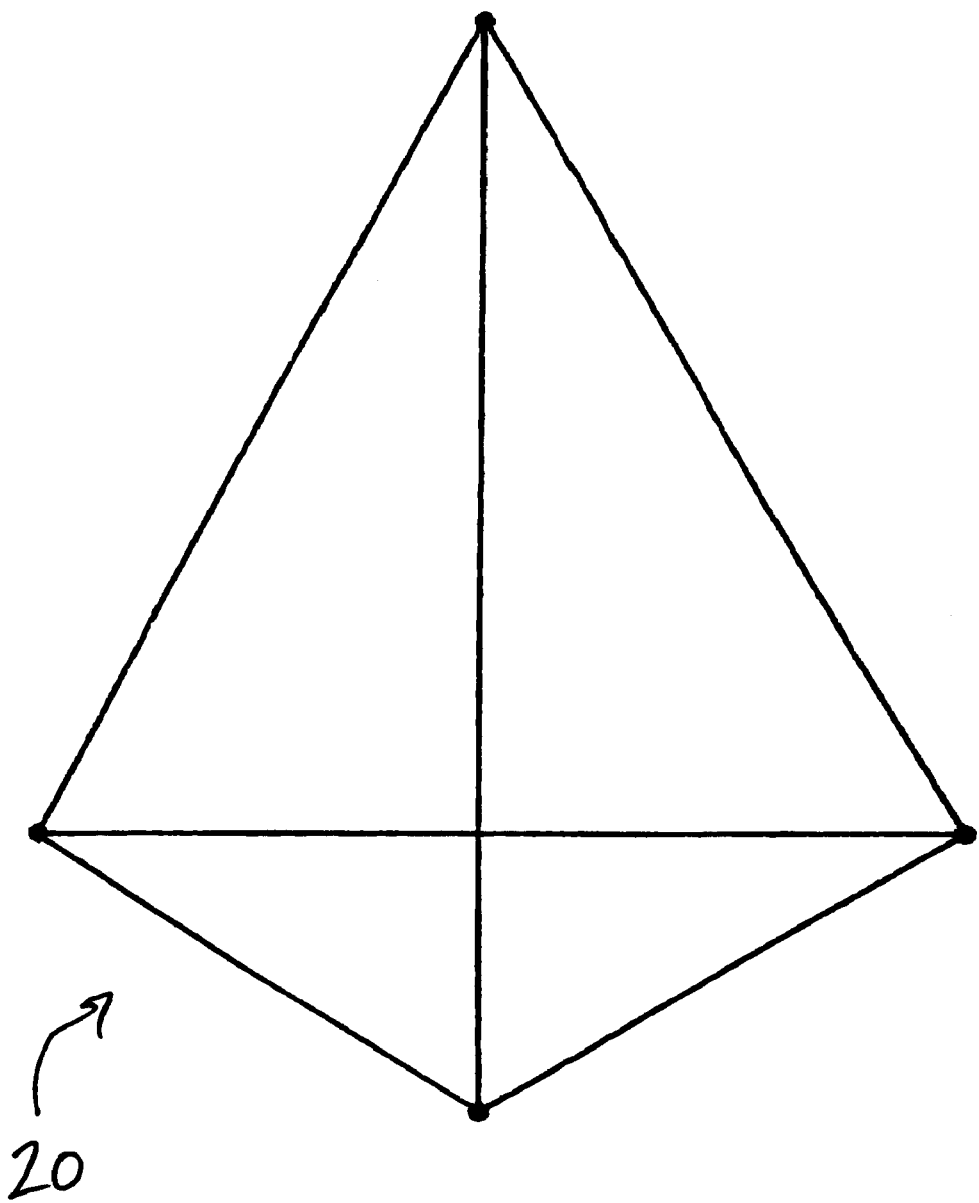
FIG. 3 shows schematically the arrangement of four different digital fingerprints as a mapping in the finite projective space PG(d,q).

FIG. 3 shows the arrangement of four different digital fingerprints as a mapping in the finite projective space PG(d,q).

Such a system can be used with a higher number of customers if a distribution key is employed. Parameter d provides the maximum number of colluding hackers for which manipulation can still be identified. Parameter q+1 is the number of customers involved in the distribution key of the document.

Such a system can thus provide copies of the document to q+1 customers so that the following two requirements are met:

1. Each copy is assigned to exactly one customer;
2. If k customers collude as hackers with k<d+1 and remove all the fingerprint portions from a document they can identify by bit by bit comparison, these k customers acting as hackers can be uniquely identified from the fingerprint portions still remaining in the manipulated document.

FIG. 3 shows the method according to the present invention in greater detail in the three-dimensional space using a tetrahedron 20.

A fingerprint is composed of points located on one side of the tetrahedron. Therefore four customers have received a copy of the document. Due to the selected geometry, two digital fingerprints always intersect in exactly one straight line and three fingerprints always intersect in exactly one point. This means that using the set of intersection points of two or three fingerprints, the two or three customers who as hackers have attempted to remove the fingerprints can be identified. In this system, the maximum number of hackers that can be identified is therefore limited to three.

It is assumed that, in general, at the most one solution is used with a dual rational normal curve R in the finite projective space PG(d;q). The rational normal curve R is dimensioned as a set of q+1 hyperplanes (i.e., projective (d−1)-dimensional subspaces), d of which intersect at one point and this point of intersection uniquely defines the d hyperplanes.

R is determined by initially considering a rational normal curve R'. R' is a set of q+1 points in the finite projective space PG(d,q), at the most d of which are located in a common hyperplane. R' can be expressed in homogeneous coordinates as $$R'=\{(1,t,t^2,\ldots t^{d-1}) | t \in GF(q)\} \cup \{(0,0,0,\ldots,0,1)\}$$

By switching the roles of points and hyperplanes, the dual rational normal curve R is obtained using the principle of duality.

As defined herein, an electronic document includes such electronic files as those representing audio, video or text.

What is claimed is:

1. A method of inserting manipulation-proof digital fingerprints for an electronic document, a first copy of document being assigned to a first purchaser and a second copy of the document being assigned to a second purchaser, the method comprising:

inserting a first fingerprint into the first copy at a first marking location;

inserting a second fingerprint into the second copy at a second marking location, the first and second marking locations being different and being assigned as a function of a finite geometric structures having a plurality of points, the first and second marking locations being determined as function of geometric structures of the finite geometric structure so that first assigned points of the plurality of points corresponds to the first fingerprint and second assigned points of the plurality of points corresponds to the second fingerprint, the first and second assigned points partially intersecting; and performing a bit-by-bit comparison of an original of the document with the first copy to see if parts of the first fingerprint have been removed by manipulation.

2. The method as recited in claim 1 further comprising identifying the first purchaser as a function of removed parts of the first fingerprint.

3. The method as recited in claim 1 wherein the finite geometric structure is a dual rational normal curve in a finite projective space, the first and second marking locations being a function of the dual rational normal curve in the projective space and of a one-way function.

4. The method as recited in claim 3 wherein a first hyperplane formed by the dual rational normal curve is assigned to the first purchaser, and further comprising comparing the first copy bit by bit with an original of the document and reconstructing a corresponding subspace in the projective space as a function of different marking locations in the first copy and the original using a reverse function of the one-way function so as to identify the first purchaser.

5. A method of inserting a manipulation-proof digital fingerprints for an electronic document, a first copy of the electronic document being assigned to a first purchaser and a second copy of the electronic document being assigned to a second purchaser, the method comprising:

inserting a first fingerprint into the first copy at a first marking location;

inserting a second fingerprint into the second copy at a second marking location, the first and second marking locations being different and being assigned as a function of a finite geometric structure having a plurality of points, the first and second marking locations being determined as a function of geometric substructures of the finite geometric structure so that first assigned points of the plurality of points correspond to the first fingerprint and second assigned points of the plurality of points correspond to the second fingerprint, the first and second assigned points partially intersecting; and comparing bit-by-bit an original copy of the electronic document with a third copy of the electronic document, the third copy of the electronic document containing parts of at least one digital fingerprint removed by at most a number of particular purchasers, so that any individuals acting as hackers are identifiable from any assigned points still present.

* * * * *